(No Model.)
W. F. BIRGE.
MANUFACTURE OF STARCH.
No. 329,701. Patented Nov. 3, 1885.
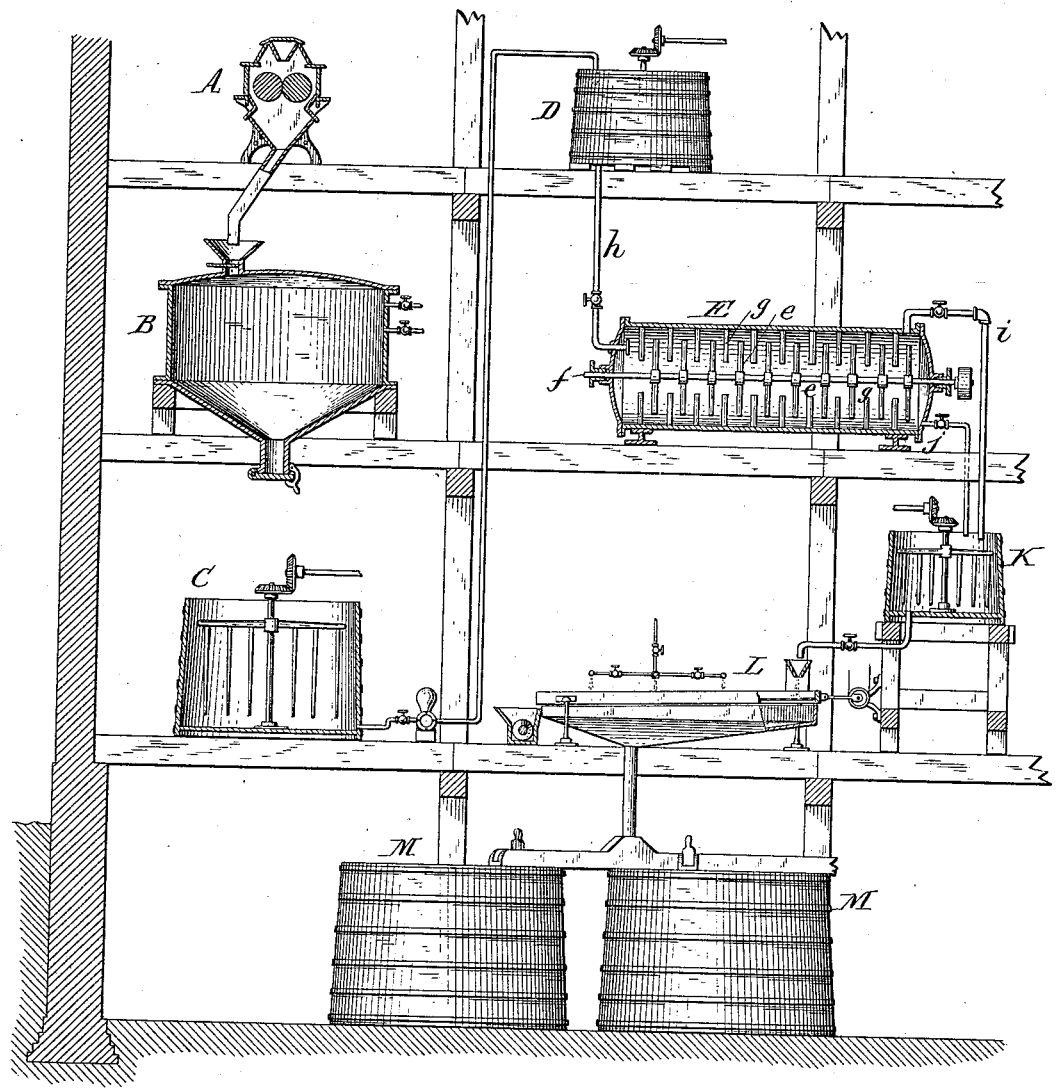

UNITED STATES PATENT OFFICE.

WALTER F. BIRGE, OF BUFFALO, NEW YORK.

MANUFACTURE OF STARCH.

SPECIFICATION forming part of Letters Patent No. 329,701, dated November 3, 1885.

Application filed July 3, 1885. Serial No. 170,626. (No m del.)

*To all whom it may concern:*

Be it known that I, WALTER F. BIRGE, of the city of Buffalo, in the county of Erie and State of New York, have invented a new and useful Improvement in the Manufacture of Starch, of which the following is a specification.

This invention relates to an improvement in the method of extracting starch from grain, especially Indian-corn or maize, and has for its object to increase the yield of starch and to simplify the process of extraction.

The accompanying drawing represents a plant of machinery by which my invention may be practiced.

A represents a reduction-machine whereby the grain is coarsely broken or crushed. A roller-mill having its rollers provided with suitable flutes or ribs is preferably employed for this purpose; but a pair of millstones or any other suitable machine may be employed, if desired.

B represents the steep-vat which receives the crushed grain from the reduction-machine A, and in which the grain is steeped in warm water for a sufficient length of time to thoroughly soften the grain. The temperature of the steep-water is kept below 160° Fahrenheit to prevent the destruction of the starch-cells. As the kernels of the grain have been broken, the warm water has access to the interior starchy portions of the kernels, and the process of steeping proceeds more rapidly and uniformly than when the whole grain is steeped. The duration of the steeping process is variable, and depends somewhat upon the condition of the grain, whether new or dry, and the temperature of the atmosphere; but a much shorter period of time than usually allowed is sufficient to properly steep the crushed grain.

C represents a mixing-tank which receives the steeped grain, and in which the latter is mixed with water, and the mixture thereby reduced to a gravity of from 8° to 12° Baumé. If the steeped grain is not sufficiently fine, it may be reground or recrushed to the proper degree of fineness before it passes into the mixing-tank C. A suitable quantity of caustic alkali is preferably added to the mixture in the tank C and thoroughly incorporated therewith by stirring the mixture.

D represents an elevated receiving-tank into which the mixture is pumped from the mixing-tank C.

E represents a pressure-agitator which receives the mixture from the receiving-tank D, and in which the mixture is thoroughly beaten or agitated under pressure. As shown in the drawing, the agitator E consists of a closed cylindrical vessel provided with stirrers $e$, mounted on a rotating shaft, $f$, and moving between stationary stirrers $g$; but any other suitable system of stirrers or agitating devices may be employed which will thoroughly agitate the mixture of ground grain and water passing through the vessel E. For instance, the latter may be provided with two parallel shafts carrying stirrers which revolve between the shafts in opposite directions. Some of the stirrers may be arranged at an angle to the direction of rotation to resist the movement of the liquid through the agitator in order to stir the liquid more thoroughly.

$h$ represents the supply-pipe which conducts the liquid from the receiver D to one end of the agitator E, and $i$ is the discharge-pipe through which the liquid escapes from the opposite end of the agitator. Both of these pipes are provided with suitable valves or cocks for regulating the flow of the liquid through these pipes and the agitator. The discharge-pipe $i$ rises above the top of the agitator, whereby the latter is always kept full of liquid, which latter is subjected in the agitator to the pressure of the column of liquid in the supply-pipe $h$ and receiver D. This pressure also tends to keep the agitator filled with the liquid and insures the proper working of the agitating arms or blades upon the liquid, and causes the solid particles suspended in the liquid to rub against each other and against the agitating arms or stirrers, thereby causing the starch particles which adhere to the bran fragments to become detached therefrom, partly by the attrition of the solid particles against each other and partly by the action of the stirring devices. The agitation of the liquid in the vessel E also causes a complete incorporation of the alkali with the material under treatment when the alkali is added to the material before it enters the agitator. Instead of producing the desired pressure in the agitator E by a column of liquid, as described and shown, it may be produced by pumping the liquid into the agitator and properly regulating the outflow of the liquid through the discharge-pipe $i$. The vessel E is provided at its bottom with a drain-pipe, $j$, through which the contents of the vessel can be discharged at the end of the operation.

K represents a tank which receives the agitated liquid from the discharge-pipe $i$, and which supplies the liquid to the separator L, by which the bran and gluten are separated from the starch milk or liquid. As shown in the drawing, the separator consists of a shaking screen upon which sprays of water are delivered, whereby the starch is washed through the meshes of the screen. The screen is covered with wire-cloth, which is capable of resisting the action of the alkali; but, if it is preferred to add the alkali to the starch after the sifting operation has been completed, the screen can be clothed with bolting-silk. A centrifugal separator may be substituted for the screen, if desired.

M represents the settling-tubs which receive the starch-milk from the separator L, and in which the starch is allowed to settle. The liquid is then drawn off from above the starch, and the latter is further manipulated or refined as may be necessary to obtain the desired product, whether commercial starch, glucose, grape-sugar, &c. The bran and other offal which tails off from the separator are utilized as feed, either wet or after being dried in the usual manner.

The thorough agitation which the liquid receives in the agitator E liberates the starch particles which adhere to the bran and gluten, and renders it possible to recover such particles, thereby preventing the latter from passing off with the offal from the separator, and increasing the yield of starch accordingly.

I claim as my invention—

1. The herein-described method of extracting starch from grain, which consists in agitating the liquid containing the reduced grain in a closed vessel under pressure, whereby the starch becomes detached from the bran or offal, and then separating the starch from the bran or offal, substantially as set forth.

2. The herein-described method of extracting starch from grain, which consists in reducing and steeping the grain, then reducing the liquid to the proper gravity, then agitating the liquid in a closed vessel under pressure, and then separating the starch from the offal, substantially as set forth.

3. The herein-described method of extracting starch from grain, which consists in reducing and steeping the grain, then reducing the liquid to the proper gravity and adding the alkali, then agitating the liquid in a closed vessel under pressure, and then separating the starch from the offal, substantially as set forth.

Witness my hand this 29th day of June, 1885.

WALTER F. BIRGE.

Witnesses:
 JNO. J. BONNER,
 C. F. GEYER.